Figure 1:
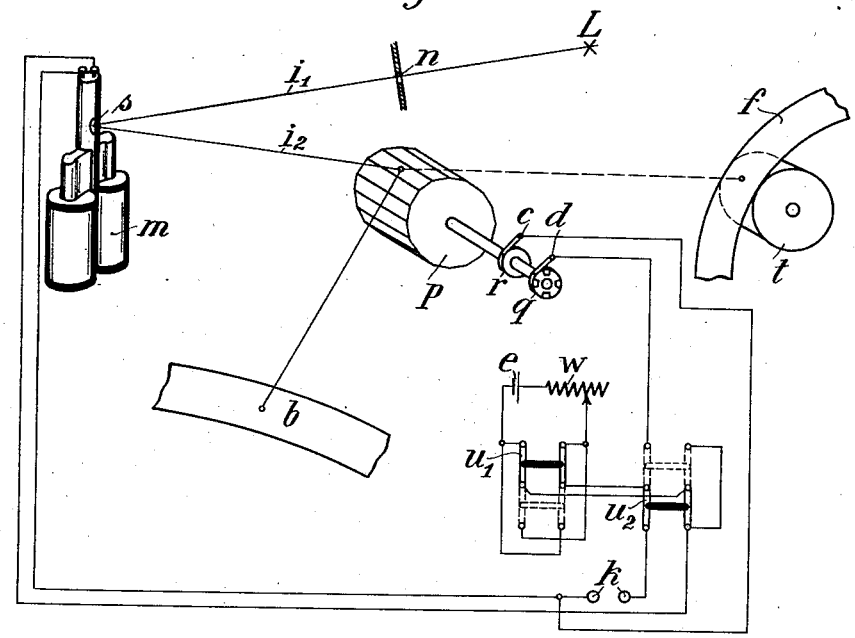

G. MYLO.
APPARATUS FOR CHECKING ELECTROCARDIOGRAPHS, OSCILLOGRAPHS, AND THE LIKE.
APPLICATION FILED APR. 8, 1913.

1,151,118.

Patented Aug. 24, 1915.

UNITED STATES PATENT OFFICE.

GUSTAV MYLO, OF CHARLOTTENBURG, GERMANY, ASSIGNOR TO SIEMENS & HALSKE, A. G., OF BERLIN, GERMANY, A CORPORATION OF GERMANY.

APPARATUS FOR CHECKING ELECTROCARDIOGRAPHS, OSCILLOGRAPHS, AND THE LIKE.

1,151,118.     Specification of Letters Patent.    Patented Aug. 24, 1915.

Application filed April 8, 1913. Serial No. 759,791.

*To all whom it may concern:*

Be it known that I, GUSTAV MYLO, a citizen of the German Empire, and residing at Charlottenburg, near Berlin, Germany, have invented certain new and useful Improvements in Apparatus for Checking Electrocardiographs, Oscillographs, and the like, of which the following is a specification.

My invention relates to electro-cardiographs, oscillographs and the like, and particularly to apparatus for checking the same.

When it is desired to alter the sensitiveness of the moving system (for example the testing loop, oscillatory wire, or the like) of an electro-cardiograph, and the directing force (for example the tension of the loop or wire) is varied for this purpose, a change occurs in the oscillatory condition of the moving system, because the movement of inertia and damping of this system remain unchanged, whereas the tension is no longer the same. If, for example, the oscillatory condition of the moving system has been aperiodic and the directing tension is reduced in order to increase the sensitiveness, a change into a still more aperiodic condition occurs, or if the directing tension is increased the aperiodically damped system becomes converted into one periodically damped. The oscillatory condition of the moving system of an electro-cardiograph cannot, however, be an arbitrary one, but in order to obtain a true representation of the movements to be recorded the moving system must be strongly damped and, if possible, aperiodic.

Since it must be possible to vary the sensitiveness of the moving system between wide limits, and since the directing forces employed will accordingly have various values, it frequently happens in the case of electro-cardiographs that when the sensitiveness of the moving system is either too great or too small an oscillatory condition thereof is obtained which is unsuitable for the purposes of such cardiographs. Heretofore no apparatus has been used in connection with electro-cardiographs whereby it is possible to check the oscillatory condition of the moving system.

A primary object of my invention is to provide the electro-cardiograph with apparatus which allows both the oscillatory condition and the sensitiveness of the moving system to be checked. When employing my apparatus, I obtain by means of the electro-cardiograph a record of a series of curves whose real instantaneous values are exactly known; for example, it is possible to obtain by means of the electro-cardiograph a record showing the instantaneous values of the intermittent current in a perfectly non-inductive circuit wherein a constant electromotive force is applied. By comparing the curve obtained with the theoretical curve it is possible to gage both the oscillatory condition and the sensitiveness of the moving system of the cardiograph.

One illustrative embodiment of my invention is represented by way of example in the accompanying drawing, wherein—

Figure 2:
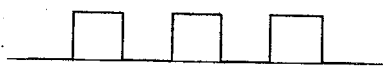
Figure 3:
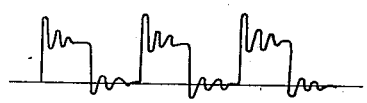
Figure 4:
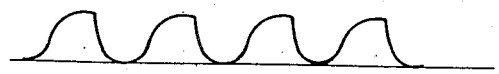

Figure 1 is a diagram showing a preferred form of my apparatus associated with an electro-cardiograph, the essential parts of the latter being diagrammatically shown in perspective, and Figs. 2 to 4 are curves obtained by means of my apparatus.

Referring first to Fig. 1, $m$ designates the electromagnet of the electro-cardiograph, between the poles of which the movable system, *e. g.* the test-loop, is located. $s$ denotes the mirror of the electro-cardiograph, and L the source of light which sends the light-ray $i_1$ through an aperture $n$ to the mirror $s$. When a photographic record is being made the ray $i_2$ reflected by the mirror falls onto the film $f$ which is driven by the roller $t$. A rotatable polygonal mirror $p$ can be raised and lowered and, when it is desired to make the photographic record, is first placed in such a position that it intercepts the ray reflected toward the photographic film $f$ and directs it onto the surface $b$, which is preferably curved. In this position of the polygonal mirror a spot of light is focused on the observation surface $b$. When the mirror $s$ of the electro-cardiograph oscillates a curve of light is delineated on the surface $b$, which curve represents the oscillations of the mirror $s$ and consequently the instantaneous values of the current in the test-loop or the like. On the axle of the polygonal mirror $p$ is mounted a slip-ring $r$ and, in addition, a contact-disk $q$ of insulating material containing a number of metal segments electrically connected with the slip-ring. The number of metal segments is preferably half the number of the sides of the polygonal mirror. $c$ and $d$ designate two stationary brushes, of which the one slides on the slip-ring, and the other on the contact-disk; when the polygonal mirror rotates these brushes are intermittently connected together, such connection occurring each time the brush $d$ contacts with a metal segment. $e$ is a source of direct current, which is connected over a regulatable, non-inductive resistance $w$ to the reversing switch $u_1$. The middle terminals of this switch $u_1$ are connected to the middle terminals of a change-over switch $u_2$.

When the change-over switch $u_2$ is in the position indicated by full lines, the source of current $e$ is connected in series with the non-inductive resistance $w$ and the test-loop to the terminals $k, k$, between which the circuit to be tested is connected. The change-over switch is then in the position for obtaining the cardiographic records. The source of current $e$ here serves for compensating the constant portion of the effective electromotive force set up by the organism of the patient. The source of current $e$ must therefore be connected in opposition to the effective electromotive force in the circuit under test, and the reversing switch $u_1$ renders this possible.

When the change-over switch $u_2$ is placed into the position shown in dotted lines in the drawing, the test-loop of the electric cardiograph is connected in series with the source of current $e$, the regulatable, non-inductive resistance $w$, and the brushes $c, d$. When so connected the test-loop is traversed by a current supplied only from the source of current $e$ as soon as the brush $d$ rests on a contact-segment of the contact-disk $q$ and the circuit is thereby closed. When the polygonal mirror is now rotated, the circuit is intermittently closed and opened. As the circuit is perfectly non-inductive, the successive values of the current will be such as shown by the curve Fig. 2. As a rule, however, the current values reproduced by the cardiograph are not the absolutely true values, but are modified according to a law dependent on the oscillatory condition of the moving system. When the test-loop vibrates periodically, the curve recorded by the cardiograph will be such as that shown in Fig. 3. If, however, the oscillatory condition is an aperiodic one, a curve such as that shown in Fig. 4 must be obtained.

In view of the above, I check or test the oscillatory condition of the cardiograph by first placing the change-over switch $u_2$ in the position indicated by dotted lines, and thus supplying the test-loop with a current of the form shown in Fig. 2, and then, with the aid of the polygonal mirror $p$ rotating synchronously with the current interrupter, by observing on the observation surface $b$ the instantaneous values of the current as indicated by the loop. The curve obtained enables a conclusion to be drawn as to the oscillatory condition of the loop, and the directing tension of the loop can accordingly be so adjusted that the desired aperiodic or slightly damped oscillatory condition of the loop is obtained.

Simultaneously with the determination of the oscillatory condition of the loop, the sensitiveness thereof can also be ascertained. Since the current supplied from the source of current $e$ and passed through the test-loop can be measured by means of an ammeter, it is readily possible to ascertain the sensitiveness of the loop from the values of the amplitudes shown on the observation surface and from the constants of the apparatus.

Instead of the combination of the polygonal mirror $p$ and the observation surface $b$, that of a stationary mirror and a rotating observation surface may be used, the necessary interrupter for obtaining the cyclic effect with the direct current being then rotated synchronously with the observation surface.

I claim:—

1. In apparatus of the character described, the combination of a reflecting galvanometer having an adjustable oscillatory system, means for obtaining visible representations of the movements of said system, terminals for connection to a circuit to be tested, a test circuit including means for producing therein a cycle of resultant voltages of known wave-form, and means for connecting said galvanometer either with the test circuit or with said terminals.

2. In apparatus of the character described, the combination of a reflecting galvanometer having an adjustable oscillatory system, means for obtaining visible representations of the movements of said system, terminals for connection to a circuit to be tested, a test circuit including a constant source of electromotive force, a regulatable, non-inductive resistance, and an interrupter; and means for connecting said galvanometer either with the test circuit or with said terminals.

3. In apparatus of the character described, the combination of a reflecting galvanometer having an adjustable oscillatory system, means comprising a rotatable mirror for obtaining visible representations of the movements of said system, terminals for connection to a circuit to be tested, a test circuit including a constant source of electromotive force, a regulatable, non-inductive resistance, and an interrupter; said interrupter being coupled to said mirror, and means for connecting said galvanometer either with the test circuit or with said terminals.

4. In apparatus of the character described, the combination of a reflecting galvanometer having an adjustable oscillatory system, means for obtaining visible representations of the movements of said system, terminals for connection to a circuit to be tested, a local circuit including a constant source of electromotive force, a regulatable, non-inductive resistance and a reversing switch; an interrupter, and means comprising a change-over switch for connecting said galvanometer either in series with said terminals and said local circuit or with the latter and said interrupter.

In testimony whereof I have signed my name to this specification in the presence of two witnesses.

GUSTAV MYLO.

Witnesses:
WOLDEMAR HAUPT,
HENRY HASPER.